(12) United States Patent
Kuwano et al.

(10) Patent No.: US 10,884,229 B2
(45) Date of Patent: Jan. 5, 2021

(54) IMMERSION MICROSCOPE OBJECTIVE

(71) Applicant: OLYMPUS CORPORATION, Hachioji (JP)

(72) Inventors: Makoto Kuwano, Tokyo (JP); Bunryu Arashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 91 days.

(21) Appl. No.: 16/377,909

(22) Filed: Apr. 8, 2019

(65) Prior Publication Data

US 2019/0324256 A1    Oct. 24, 2019

(30) Foreign Application Priority Data

Apr. 19, 2018  (JP) ................. 2018-080952

(51) Int. Cl.
*G02B 21/33*      (2006.01)
*G02B 21/02*      (2006.01)
*G02B 21/00*      (2006.01)

(52) U.S. Cl.
CPC ......... *G02B 21/33* (2013.01); *G02B 21/0072* (2013.01); *G02B 21/0076* (2013.01); *G02B 21/02* (2013.01)

(58) Field of Classification Search
CPC ................ G02B 21/33; G02B 21/0072; G02B 21/0076; G02B 21/02
USPC ...................................................... 359/656
See application file for complete search history.

(56) References Cited

U.S. PATENT DOCUMENTS

| 7,382,542 B2 | 6/2008 | Wartmann |
| 9,746,658 B2* | 8/2017 | Abe ................. G02B 21/02 |
| 2002/0089760 A1 | 7/2002 | Yamaguchi |
| 2006/0203354 A1 | 9/2006 | Fujimoto et al. |

(Continued)

FOREIGN PATENT DOCUMENTS

| JP | 2002148519 A | 5/2002 |
| JP | 2002350734 A | 12/2002 |

(Continued)

*Primary Examiner* — James R Greece
(74) *Attorney, Agent, or Firm* — Holtz, Holtz & Volek PC

(57) ABSTRACT

An immersion microscope objective includes: a first lens group that includes a meniscus lens component that is the closest to an image in the first lens group, the meniscus lens component having a convex surface facing an object; and a second lens group, the objective satisfying the following conditional expressions:

$1.4 < NA_{ob} \leq 1.51$ (1)

$1.30 \text{ mm} \leq Y_{reso} \times NA_{ob}{}^8$ (2)

$L_{total} \leq 65 \text{ mm}$ (10)

where $NA_{ob}$ indicates the numerical aperture of the objective; $Y_{reso}$ a maximum object height within a region on a plane orthogonal to an optical axis that crosses a position on the optical axis at which an RMS wave aberration in a d line is minimized, the region having an RMS wave aberration in the d line that is $0.1\lambda_d$ or less provided therewithin; $\lambda_d$, the wavelength of the d line; $L_{total}$, a distance on the optical axis from an object surface to the lens surface that is the closest to the image.

19 Claims, 9 Drawing Sheets

(56) References Cited

U.S. PATENT DOCUMENTS

| | | | |
|---|---|---|---|
| 2008/0149867 A1 | 6/2008 | Konishi et al. | |
| 2009/0027769 A1 | 1/2009 | Saito et al. | |
| 2009/0032732 A1 | 2/2009 | Konishi et al. | |
| 2009/0296204 A1* | 12/2009 | Schuster | G02B 17/0812 359/365 |
| 2010/0020390 A1* | 1/2010 | Dodoc | G02B 17/0816 359/364 |
| 2011/0043906 A1 | 2/2011 | Saito et al. | |
| 2011/0043924 A1 | 2/2011 | Saito et al. | |

FOREIGN PATENT DOCUMENTS

| | | |
|---|---|---|
| JP | 2007121338 A | 5/2007 |
| JP | 2008170969 A | 7/2008 |
| JP | 2010008989 A | 1/2010 |
| JP | 2013140393 A | 7/2013 |

\* cited by examiner

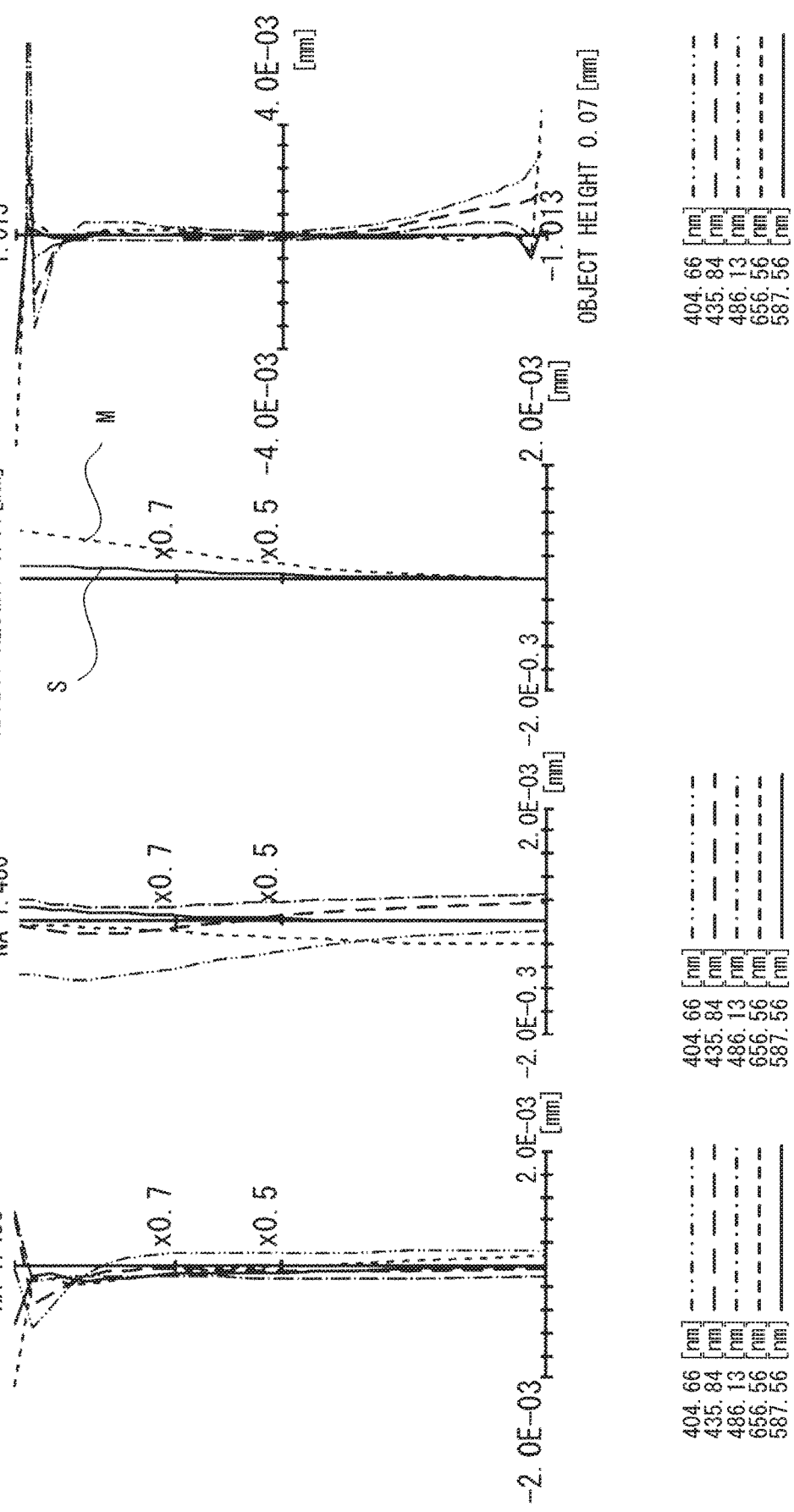

IMMERSION MICROSCOPE OBJECTIVE

CROSS REFERENCE TO RELATED APPLICATIONS

This application is based upon and claims the benefit of priority from prior Japanese Patent Application No. 2018-080952, filed Apr. 19, 2018, the entire contents of which are incorporated herein by this reference.

BACKGROUND OF THE INVENTION

Field of the Invention

The disclosure herein relates to an immersion microscope objective.

Description of the Related Art

In the field of biological microscopes in recent years, microscope apparatuses have been increasingly expected to allow observation and image capturing to be performed with both a wide field of view and a high resolution. There has been a demand for microscope objectives that have a high numerical aperture (hereinafter referred to as NA) and that achieve a high aberration performance over a wide field of view in order to achieve such a microscope apparatus. Biological microscopes may use excitation light with a wide bandwidth ranging from a short wavelength of about 400 nm to a near-infrared wavelength. Accordingly, it will be desirable that microscope objectives can accommodate a fluorescence observation using excitation light having any wavelength that falls within a wide wavelength band.

Conventional immersion microscope objectives having a high NA are described in, for example, Japanese Laid-open Patent Publication Nos. 2008-170969 and 2002-148519.

SUMMARY OF THE INVENTION

An immersion microscope objective in accordance with an aspect of the present invention includes: a first lens group that includes a meniscus lens component that is the closest to an image among the components of the first lens group, the meniscus lens component having a convex surface facing an object; and a second lens group that is closer to the image than the first lens group is. The microscope objective satisfies the following conditional expressions:

$$1.4 < NA_{ob} \leq 1.51 \quad (1)$$

$$1.30 \text{ mm} \leq Y_{reso} \times NA_{ob}^8 \quad (2)$$

$$L_{total} \leq 65 \text{ mm} \quad (10)$$

In these conditional expressions, $NA_{ob}$ indicates the numerical aperture of the object side of the microscope objective; $Y_{reso}$, a maximum object height within a region on a plane orthogonal to an optical axis that crosses a position on the optical axis at which an RMS wave aberration in a d line is minimized, the region having an RMS wave aberration in the d line that is $0.1\lambda_d$ or less provided therewithin; $\lambda_d$, the wavelength of the d line; $L_{total}$, a distance on the optical axis from an object surface to the lens surface that is the closest to the image among the lens surfaces of the microscope objective.

BRIEF DESCRIPTION OF THE DRAWINGS

The present invention will be more apparent from the following detailed description when the accompanying drawings are referenced.

FIGS. 9A-9D are each an aberration diagram for the objective 4 depicted in FIG. 8.

DESCRIPTION OF THE EMBODIMENTS

Figure 1:
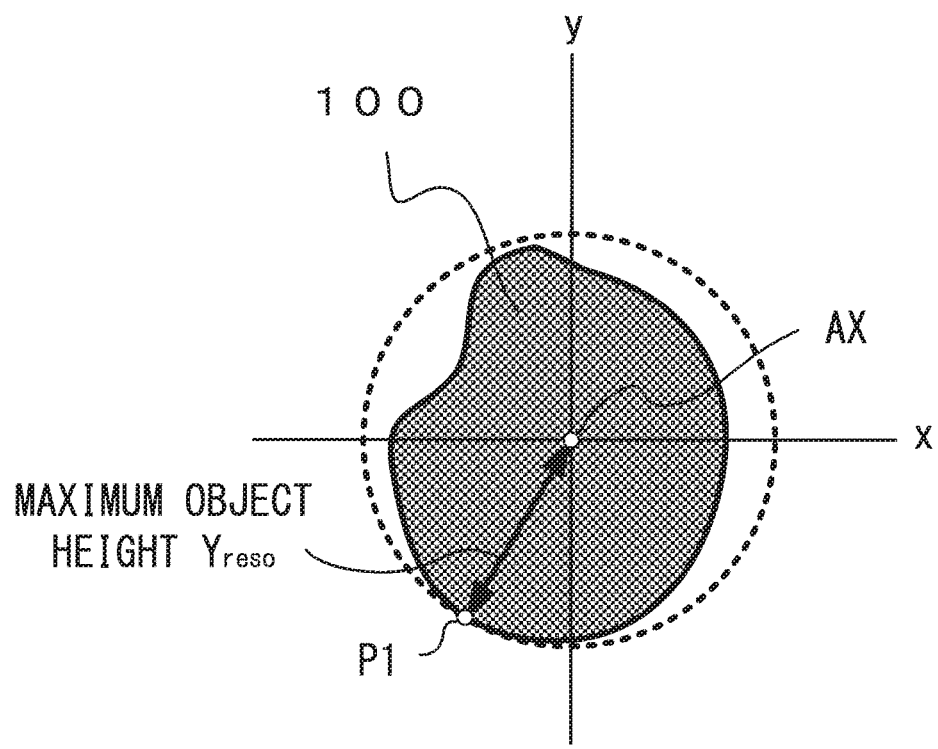
FIG. 1 illustrates a maximum object height $Y_{reso}$.

Neither of the microscope objectives described in Japanese Laid-open Patent Publication Nos. 2008-170969 and 2002-148519 can have both a sufficiently high NA and a sufficiently high aberration performance for the entirety of a wide field of view.

The following describes an objective in accordance with an embodiment of the present application. The objective in accordance with the embodiment (hereinafter simply referred to as an objective) is an infinity-corrected microscope objective to be used in combination with a tube lens. The objective is what is called an immersion microscope objective and is used to observe a sample with an immersion liquid between the sample and the objective.

The objective includes: a first lens group that includes a meniscus lens component that is the closest to an image among the components of the first lens group, the meniscus lens component having a convex surface facing an object; and a second lens group that is closer to the image than the first lens group is. More particularly, the meniscus lens component that is the closest to the image among the components of the first lens group has a lens outer diameter such that the lens outer diameter divided by a thickness that the meniscus lens component has on an optical axis is 4 or lower. When the meniscus lens component is a cemented lens, the outer diameter of the meniscus lens component refers to the outer diameter of a lens that is the closest to the image among the lenses that constitute the meniscus lens component. When the first lens group includes a plurality of meniscus lens components each having a lens outer diameter such that the lens outer diameter divided by a thickness that the meniscus lens component has on the optical axis is 4 or lower, the meniscus lens component that is the closest to the image among the components of the first lens group refers to the meniscus lens component that is the closest to the image among the plurality of meniscus lens components. A border between the first and second lens groups may be identified in accordance with this feature.

The pencil of light herein refers to a pencil of light rays emitted from one point of an object (object point). Whether a single lens or a cemented lens, a lens component refers to one lens block that includes lens surfaces through which a light ray from an object point passes, wherein only a surface on an object side and a surface on an image side among these lens surfaces, i.e., only two of these lens surfaces, are in contact with air (or immersion liquid).

The first lens group turns a pencil of diverging light rays from an object point into a pencil of converging light rays within the first lens group. Subsequently, the first lens group decreases a marginal ray height of the pencil of converging light rays within the meniscus lens component that is the closest to the image among the components of the first lens group and then emits the pencil of converging light rays from the concave surface of the meniscus lens component toward the second lens group. In addition, the second lens group turns the pencil of converging light rays from the first lens group into a pencil of parallel light rays. Accordingly, a Petzval sum can be corrected effectively, with the result that field curvatures can be corrected in a preferable manner for the entirety of a wide field of view.

The objective satisfies the following conditional expressions:

$$1.4 < NA_{ob} \leq 1.51 \quad (1)$$

$$1.30 \text{ mm} \leq Y_{reso} \times NA_{ob}^8 \quad (2)$$

In these conditional expressions, $NA_{ob}$ indicates the numerical aperture of the object side of the objective; $Y_{reso}$, a maximum object height within a region on a plane orthogonal to an optical axis that crosses a d-line minimization position, the region having an RMS wave aberration in the d line that is $0.1\lambda_d$ or less provided therewithin when counterlight tracking is performed; $\lambda_d$, the wavelength of the d line. The d-line minimization position is a position on the optical axis at which an RMS wave aberration in the d line is minimized in counterlight tracking, wherein the d-line minimization position is a position on the optical axis within a region on the object side of the objective.

Maximum object height $Y_{reso}$ is a maximum object height within a region 100 that satisfies a predetermined condition, as indicated in FIG. 1. Note that FIG. 1 indicates a cross section orthogonal to an optical axis of the objective that crosses the d-line minimization position (hereinafter referred to as a d-line minimization cross section). Maximum object height $Y_{reso}$ is calculated as follows: First, (RMS wave aberration in the d line)/$\lambda_d$ is calculated for each point on the d-line minimization cross section. Second, a region 100 on the d-line minimization cross section that satisfies (RMS wave aberration in the d line)/$\lambda_d \leq 0.1$ is identified. Third, a point within the region 100 that is the most distant from an optical axis AX is identified as a point P1. Finally, the distance between the point P1 and the optical axis AX is calculated as maximum object height $Y_{reso}$.

When the objective has rotational symmetry, the region 100 also has rotational symmetry (i.e., a circular shape). Accordingly, the region 100 has a constant object height irrespective of orientation, and maximum object height $Y_{reso}$ is this constant object height. Meanwhile, when the objective has a manufacturing error, the region 100 has rotational asymmetry. As a result, the region 100 has an object height that depends on an orientation, as depicted in, for example, FIG. 1. In this case, maximum object height $Y_{reso}$ is an object height in an orientation in which the distance from the optical axis to a border of the region 100 is maximized.

Conditional expression (1) is directed to providing a sufficient resolution in an observation using the objective. When $NA_{ob}$ is lower than a lower limit of conditional expression (1), an Airy disk diameter cannot be made sufficiently small, and a depth of focus increases. Hence, a sufficient resolution cannot be provided. When $NA_{ob}$ is higher than an upper limit of conditional expression (1), It is difficult to correct aberrations for a wide field of view in consideration of a limited entire length of the objective. As a result, it becomes difficult to observe a wide field of view with sufficient brightness.

Conditional expression (2) is directed to providing a sufficient resolution for a wide field of view. A higher NA provides a smaller Airy disk diameter and a less depth of focus. A higher $Y_{reso}$ allows aberrations to be corrected in a preferable manner for a wider field of view. Satisfying conditional expression (2) allows a resolution necessary in a fluoresce observation to be ensured for a wide field of view.

A confocal laser scanning microscope apparatus in a fluorescence observation may be such that excitation light has an intensity having a proportional relationship with the square of $NA_{ob}$ and isotropically radiated fluorescence is focused at an efficiency having a proportional relationship with the square of $NA_{ob}$. Accordingly, detection light will have an intensity having a proportional relationship with the fourth-power of $NA_{ob}$, and hence $NA_{ob}$ will largely affect a SN ratio or a resolution for an image provided by the confocal laser scanning microscope apparatus. Thus, it especially largely matters to the confocal laser scanning microscope apparatus whether conditional expression (2) is satisfied.

The objective desirably satisfies conditional expression (1-1), (1-2), or (1-3) instead of conditional expression (1).

$$1.405 < NA_{ob} \leq 1.5 \quad (1\text{-}1)$$

$$1.41 < NA_{ob} \leq 1.5 \quad (1\text{-}2)$$

$$1.41 < NA_{ob} \leq 1.45 \quad (1\text{-}3)$$

The objective desirably satisfies conditional expression (2-1), (2-2), or (2-3) instead of conditional expression (2).

$$1.45 \text{ mm} \leq Y_{reso} \times NA_{ob}^8 \quad (2\text{-}1)$$

$$1.60 \text{ mm} \leq Y_{reso} \times NA_{ob}^8 \quad (2\text{-}2)$$

$$1.80 \text{ mm} \leq Y_{reso} \times NA_{ob}^8 \quad (2\text{-}3)$$

In addition, the objective desirably has a 40-fold magnification or higher so that a sufficiently fine structure can be observed. The magnification of the objective, which is determined according to objective specifications, refers to a magnification achieved when the objective is combined with a tube lens having a focal length within a range from 180 mm to 200 mm. Note that for each objective, a focal length is set in advance for a tube lens to be combined with the objective.

The objective desirably satisfies the following conditional expression:

$$-2 \leq \Delta z_1 / DOF_d \leq 2 \quad (3)$$

In this conditional expression, $\Delta z_1$ indicates a difference between an h-line minimization position and a d-line minimization position in counterlight tracking, and $DOF_d$ indicates a depth of focus for a d line. Focal depth $DOF_d$ is calculated by $DOF_d = n_{im} \times \lambda_d / (2 \times NA_{ob}^2)$ where $\lambda_d$ indicates the wavelength of the d line, and $n_{im}$ indicates the refractive index of an immersion liquid. The h-line minimization position is a position on the optical axis at which an RMS wave aberration in the h line is minimized in counterlight tracking, wherein the h-line minimization position is a position on the optical axis within a region on the object side of the objective.

Conditional expression (3) is intended mainly to correct an axial chromatic aberration in a preferable manner. Biological microscope optical systems are often used to perform fluorescence observations using excitation light having a short wavelength close to the h line. Hence, axial chromatic aberration properties for the h line and the d line are important. When $\Delta z_1 / DOF_d$ is higher than an upper limit or is lower than a lower limit, an excessively large axial chromatic aberration will be caused by the objective. Hence, without significantly compensating for the axial chromatic aberration by using a tube lens, a large axial chromatic aberration would occur on an image surface. However, it is difficult in practice to compensate for a large axial chromatic aberration by using a tube lens. Compensating for an aberration by using a tube lens means providing the tube lens with an aberration. Hence, considering that the objective combined with the tube lens is switched between a plurality of objectives each having a different aberration property, it is not preferable to compensate for an axial chromatic aberration by using the tube lens. Satisfying conditional expression (3) allows the objective alone to correct an axial chromatic aberration in a preferable manner. In particular, an axial chromatic aberration can be corrected in a preferable manner even when light having a short wavelength such as the h line is used as excitation light.

The objective desirably satisfies conditional expression (3-1) or (3-2) instead of conditional expression (3). In particular, satisfying conditional expression (3-2) makes a difference between the h line minimization position and the d line minimization position equal to or less than the depth of focus multiplied by 1 so that axial chromatic aberrations can be corrected in a more preferable manner. Accordingly, misalignment of a sample caused by a chromatic aberration may be reduced even in multicolor imaging in which a microscope apparatus (e.g., a confocal microscope apparatus) having a high resolution in an optical axis direction obtains images using a plurality of excitation wavelengths and overlays these images on each other.

$$-1.5 \leq \Delta z_1/DOF_d \leq 1.5 \quad (3\text{-}1)$$

$$-1 \leq \Delta z_1/DOF_d \leq 1 \quad (3\text{-}2)$$

The first lens group desirably includes a cemented lens that is the closest to the object among the lenses of the first lens group. This cemented lens will hereinafter be referred to as a first cemented lens. The first cemented lens is desirably a cemented doublet lens and desirably includes a planoconvex lens that has a plane surface facing the object and a meniscus lens that includes a concave surface facing the object and has a negative refractive power, wherein the object, the planoconvex lens, and the meniscus lens are arranged in this order.

Providing the first cemented lens within a region located in the vicinity of the object in which a low marginal ray is provided allows the Petzval sum to be corrected effectively by using the meniscus lens that has a negative refractive power while preventing generation of spherical aberrations. If an immersion objective includes, as with a dry objective, a lens having a concave surface that is the closest to an object among the lenses of the immersion objective, bubbles are likely to be trapped between an immersion liquid and the objective. By contrast, the first cemented lens of the objective in accordance with the present embodiment has a plane surface facing the object, thereby making bubbles unlikely to be trapped between the immersion liquid and the objective.

The refractive index of the planoconvex lens included in the first cemented lens is desirably lower than that of the meniscus lens included in the first cemented lens. This is because the planoconvex lens having a refractive index lower than that of the meniscus lens causes a cemented surface of the first cemented lens to have a negative refractive power, with the result that the Petzval sum can be corrected effectively.

The first lens group desirably includes a biconvex lens in addition to the first cemented lens. The biconvex lens is desirably included in the lens component that is the closest, second closest, or third closest to the object among the lens components of the objective. Since the lens component that is the closet to the object among the components of the objective is the first cemented lens, the biconvex lens is desirably included in the lens component that is the second or third closest to the object.

To correct off-axis aberrations, a light ray height needs to be sufficiently increased by the first cemented lens and then increased or decreased, as appropriate, by the following lens components. Providing a biconvex lens at a position that is not extremely distant from the first cemented lens and, in particular, providing a biconvex lens within the lens component that is the closest, second closest, or third closest to the object among the components of the objective allows the height of a light ray forming a large angle that is emitted from the first cemented lens to be prevented from being excessively increased. Hence, the light ray height can be increased or decreased efficiently by a compact lens configuration so that off-axis chromatic aberrations can be corrected in a preferable manner.

The objective desirably satisfies the following conditional expression, where n13 indicates a refractive index that the biconvex lens included in the first lens group has for a d line.

$$1.4 \leq n13 \leq 1.85 \quad (4)$$

Conditional expression (4) defines the refractive index of the biconvex lens included in the first lens group. Satisfying conditional expression (4) allows high transmittance to be ensured for light that has a short wavelength so that a fluorescence observation using excitation light having a short wavelength can be performed with a high resolution.

At present, no general-purpose glass materials have an n13 that is lower than a lower limit of conditional expression (4). An optical material that has a high refractive index typically features high absorption and strong autofluorescence for a short wavelength. Accordingly, a material having a refractive index that is not excessively high is preferably used to achieve a high SN ratio in a fluorescence observation using excitation light having a short wavelength. When n13 is higher than an upper limit of conditional expression (4), it is difficult to ensure sufficient transmittance with a short wavelength.

The objective may satisfy conditional expression (4-1) or (4-2) in addition to conditional expression (4). In general, a lowly dispersive optical member is preferably used for a positive lens so as to correct chromatic aberrations. Satisfying conditional expression (4-1) or (4-2) allows a lowly dispersive glass material to be selected so that chromatic aberrations can be corrected in a more preferable manner.

$$n13 \leq 1.7 \quad (4\text{-}1)$$

$$n13 \leq 1.6 \quad (4\text{-}2)$$

The objective desirably satisfies the following conditional expression:

$$0 \leq |R1|/|R2| \leq 1 \quad (5)$$

In this conditional expression, R1 indicates a radius of curvature of the lens surface on the object side of the biconvex lens included in the first lens group; R2, a radius of curvature of the lens surface on the image side of the biconvex lens included in the first lens group.

Conditional expression (5) defines the radius of curvature of the biconvex lens included in the first lens group. Satisfying conditional expression (5) allows a light ray to be largely bent at the lens surface on the object side of the biconvex lens, so that an axial marginal ray height can be decreased efficiently and aberrations that occur at positions in the vicinity of the edge of a field of view, such as coma aberrations, can be corrected effectively. Accordingly, a preferable performance can also be achieved for positions in the vicinity of the edge of the field of view. Note that "axial marginal ray" is a marginal ray emitted from the object point on the optical axis.

The objective may satisfy conditional expression (5-1) or (5-2) in addition to conditional expression (5).

$$|R1|/|R2| \leq 0.85 \quad (5\text{-}1)$$

$$|R1|/|R2| \leq 0.7 \quad (5\text{-}2)$$

The second lens group desirably includes: a lens component that is the closest to the object among the components of the second lens group, the lens component having a concave surface facing the object; and at least one lens component.

Accordingly, what is called a Gauss lens group is provided such that the meniscus lens component that is the closest to the image among the components of the first lens group and the lens component that is the closest to the object among the components of the second lens group have concave surfaces adjacent to each other and facing each other. The Gauss lens group can correct a Petzval sum effectively. Hence, owing to the Gauss lens group, the objective can correct field curvatures in a more preferable manner.

An objective typically largely corrects a coma aberration by means of a lens component close to an image surface. Providing the second lens group with at least one lens component in addition to the lens component that is the closest to the object among the components of the second lens group allows the intervals between the lens components to be adjusted. Hence, a variation in a coma aberration that could be caused by a manufacturing error in, for example, the lens thickness or the radius of curvature can be appropriately compensated for by adjusting the intervals between the lens components of the second lens group.

The objective desirably satisfies the following conditional expressions:

$$2.4 \leq f1/fob \quad (6)$$

$$1.8 \leq n12 \leq 1.85 \quad (7)$$

In these conditional expressions, f1 indicates a focal length that the first cemented lens has for a d line; fob, a focal length that the objective has for the d line; n12, a refractive index that the meniscus lens included in the first cemented lens has for the d line.

Conditional expression (6) defines power of the first cemented lens. Satisfying conditional expression (6) allows the objective to correct the Petzval sum in a more preferable manner. This also allows the objective to correct axial chromatic aberrations effectively.

When f1/fob is lower than a lower limit of conditional expression (6), the power of the first cemented lens is excessively high. Hence, the light ray height is decreased at the lens components of the first cemented lens and following lens components, with the result that the lens surface (concave surface) on the image side of the meniscus lens component that is the closest to the image among the components of the first lens group has a low negative refractive power. The concave surface of the lens component that is the closest to the object among the components of the second lens group also has a low negative refractive power. Accordingly, the Gauss group has a decreased negative refractive power. This makes it difficult to correct the Petzval sum. In general, as an axial marginal ray height is increased, axial chromatic aberrations are generated more easily. When f1/fob is lower than the lower limit of conditional expression (6), an axial marginal ray having a low height is incident on a lens that is closer to the image than the first cemented lens is, thereby making it difficult to correct axial chromatic aberrations generated by the first cemented lens.

Conditional expression (7) defines the refractive index of the meniscus lens included in the first cemented lens. An optical material that has a high refractive index typically features high absorption and strong autofluorescence for a short wavelength. Accordingly, a material having a refractive index that is not excessively high is preferably used to achieve a high SN ratio in a fluorescence observation using excitation light having a short wavelength. Meanwhile, an optical material that has a high refractive index is typically highly dispersive. Hence, it is difficult to correct chromatic aberrations for a wide wavelength region by using an optical material having a high refractive index. Satisfying conditional expression (7) allows the objective to correct spherical aberrations and the Petzval sum efficiently in addition to allowing a fluorescence observation using excitation light having a short wavelength to be performed with a high resolution.

When n12 is lower than a lower limit of conditional expression (7), the curvature of a cemented surface needs to be increased to achieve a sufficient negative refractive power to correct the Petzval sum, thereby making it difficult to correct spherical aberrations together with the Petzval sum in a preferable manner. When n12 is higher than an upper limit of conditional expression (7), it is difficult to correct chromatic aberrations for a wide wavelength region, and thus it is also difficult to obtain a fluorescence image having a high SN ratio. As a result, it will be difficult to perform a fluorescence observation or structure analysis with a high resolution.

The objective may satisfy conditional expression (6-1) or (6-2) instead of conditional expression (6). Alternatively, the objective may satisfy conditional expression (6-3) in addition to conditional expression (6), (6-1), or (6-2). In particular, satisfying conditional expression (6-3) allows the height of a light ray to be prevented from being excessively increased within the first cemented lens or following lenses. Accordingly, spherical aberrations and axial chromatic aberrations can be corrected in a more preferable manner in addition to correcting the Petzval sum.

$$2.6 \leq f1/fob \quad (6\text{-}1)$$

$$2.9 \leq f1/fob \quad (6\text{-}2)$$

$$f1/fob \leq 4.3 \quad (6\text{-}3)$$

The objective desirably satisfies the following conditional expression:

$$0.095 \leq d12/L_{total} \quad (8)$$

In this conditional expression, d12 indicates a thickness that the meniscus lens included in the first cemented lens has on the optical axis; $L_{total}$, the distance on the optical axis from an object surface to the lens surface that is the closest to the image among the lens surfaces of the objective. The object surface refers to a surface that is distant from the lens surface that is the closest to the object among the lens surfaces of the objective (i.e., plane surface of the plano-convex lens of the objective) by a distance equivalent to the sum of a working distance and the thickness of cover glass.

Conditional expression (8) defines the thickness of the meniscus lens included in the first cemented lens. Satisfying conditional expression (8) allows the objective to correct the Petzval sum in a more preferable manner.

When $d12/L_{total}$ is lower than a lower limit of conditional expression (8), the meniscus lens included in the first cemented lens is excessively thin relative to the total length of the objective. Accordingly, a light ray will not have a sufficient height in the first cemented lens, resulting in an axial marginal ray becoming low in the lens components of the first lens group and the following lens components. This decreases the negative refractive power of the lens surface (concave surface) on the image side of the meniscus lens component that is the closest to the image among the components of the first lens group. The negative refractive power of the concave surface of the lens component that is the closest to the object among the components of the second lens group is also decreased. Accordingly, the Gauss lens group has a decreased negative refractive power. This makes it difficult to correct the Petzval sum.

The objective may satisfy conditional expression (8-1) instead of conditional expression (8). Alternatively, the objective may satisfy conditional expression (8-2) in addition to conditional expression (8) or (8-1). In particular, satisfying conditional expression (8-2) allows a sufficient space to be ensured for the lens components of the first cemented lens and the following lens components while the meniscus lens has a sufficient thickness to maintain a high light ray height. Only few limitations are imposed on the lens configuration of the first cemented lens and the following lens configurations so that spherical aberrations and axial chromatic aberrations can be corrected in a preferable manner in addition to the Petzval sum.

$$0.1 \leq d12/L_{total} \quad (8\text{-}1)$$

$$d12/L_{total} \leq 0.11 \quad (8\text{-}2)$$

The objective also desirably satisfies the following conditional expression:

$$2 \leq h1/h2 \leq 3 \quad (9)$$

In this conditional expression, h1 indicates the height of an axial marginal ray at the lens surface on the object side of the meniscus lens component; h2, the height of the axial marginal ray at the lens surface on the image side of the meniscus lens component. Note that the meniscus lens component refers to the lens component that is the closest to the image among the components of the first lens group.

Conditional expression (9) defines a relationship between the height of a light ray when being incident on the meniscus lens component and the height of the light ray when being emitted from the meniscus lens component. Satisfying conditional expression (9) allows spherical aberrations and coma aberrations as well as the Petzval sum to be corrected effectively.

When h1/h2 is lower than a lower limit of conditional expression (9), the lens surface on the image side of the meniscus lens component that is the closest to the image among the components of the first lens group (concave surface) has a decreased negative refractive power. Meanwhile, the height of a light ray incident on the second lens group does not become sufficiently low, and hence the concave surface of the lens component that is the closest to the object among the components of the second lens group also has a decreased negative refractive power. Accordingly, the Gauss lens group has a decreased negative refractive power. This makes it difficult to correct the Petzval sum in a preferable manner. When h1/h2 is higher than an upper limit of conditional expression (9), the Gauss lens group needs to have a high negative refractive power, and hence the two concave surfaces of the Gauss lens group that are adjacent to each other and facing each other will have excessively high degrees of curvature. Accordingly, it becomes difficult to limit the amount of generation of spherical aberrations and coma aberrations within an appropriate range, with the result that spherical aberrations and coma aberrations become difficult to correct effectively.

The objective desirably satisfies the following conditional expression, where $L_{total}$ indicates a distance on an optical axis from an object surface to the lens surface that is the closest to the image among the lens surfaces of the objective.

$$L_{total} \leq 65 \text{ mm} \quad (10)$$

Conditional expression (10) substantially defines the total length of the objective. Satisfying conditional expression (10) allows the objective and the entirety of an apparatus on which the objective is mounted to be small-sized.

The objective may use only one of the above-described conditional expressions or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the objective.

First Embodiment

Figure 2:
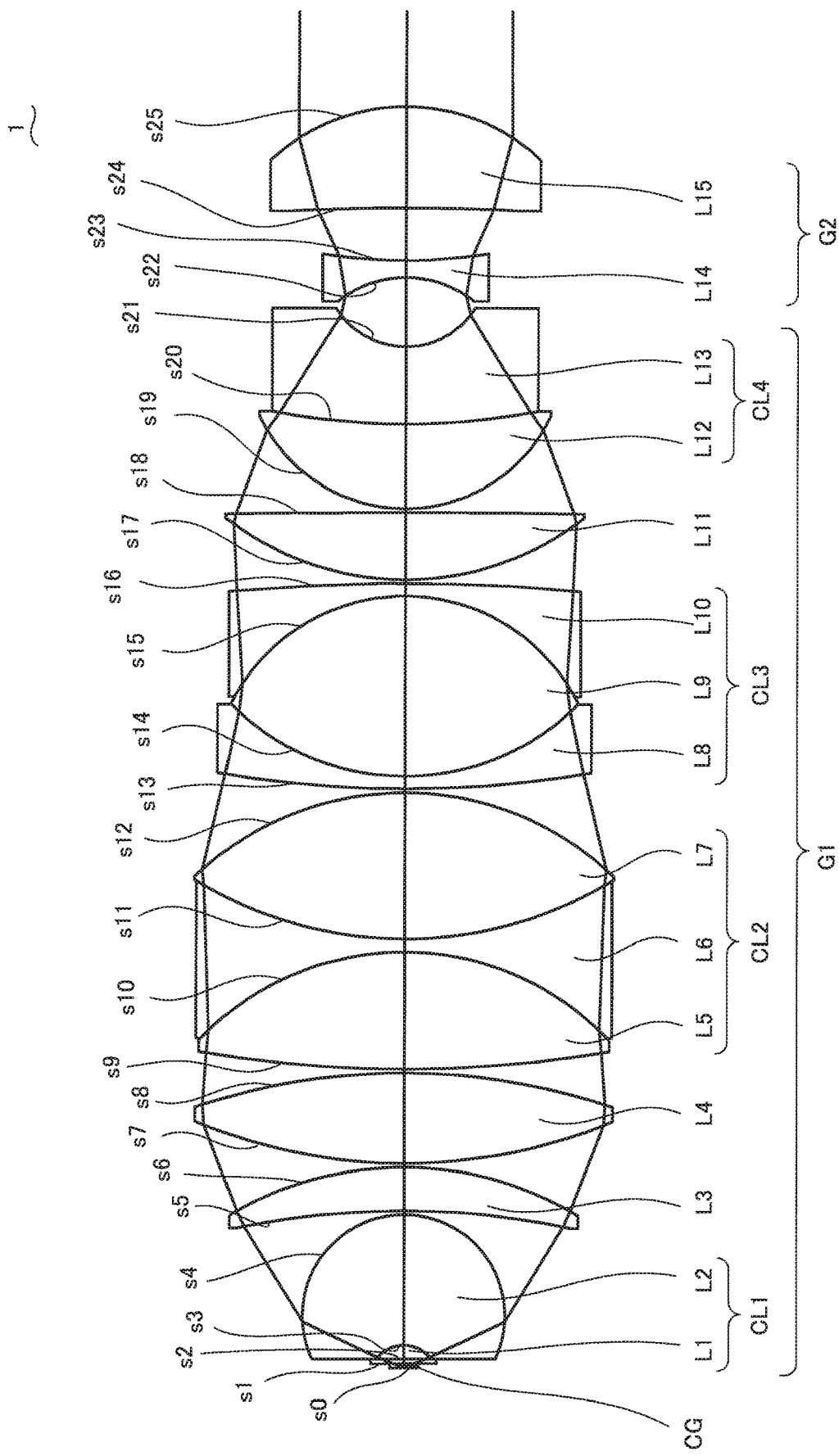
FIG. 2 is a cross-sectional view of an objective 1 in accordance with a first embodiment of the invention.

FIG. 2 is a cross-sectional view of an objective 1 in accordance with the present embodiment. The objective 1 includes: a first lens group G1 that includes a meniscus lens component that is the closest to an image among the components of the first lens group G1, the meniscus lens component having a convex surface facing an object; and a second lens group G2 that is closer to the image than the first lens group G1 is. Note that the objective 1 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a biconvex lens, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 consists of a lens L1 that is a planoconvex lens having a plane surface facing the object and a lens L2 that is a meniscus lens with a negative refractive power that has a concave surface facing the object, wherein the object, the lens L1, and the lens L2 are arranged in this order. The cemented lens CL2 is a cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L12 that is a meniscus lens having a concave surface facing the image and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 1, where $\Phi_1$ indicates the outer diameter of the lens L13, i.e., the lens that is the closest to the image among the lenses of the cemented lens CL4, wherein the cemented lens CL4 is the meniscus lens component that is the closest to the image among the components of the first lens group G1.

$NA_{ob}$=1.407, $Y_{reso}$=0.119 mm, $|\beta|$=59.997, $\Delta z_1$=−0.108 µm, $DOF_d$=0.209 µm, n13=1.5691, R1=21.482 mm, R2=−25.852 mm, f1=8.889 mm, fob=3.000 mm, n12=1.8348, $L_{total}$=49.620 mm, d12=5.142 mm, h1=5.440 mm, h2=2.550 mm, $\Phi_1$=11 mm The following are lens data of the objective 1. INF in the lens data indicates infinity (∞).

| | | Objective 1 | | | |
|---|---|---|---|---|---|
| s | r | d | nd | nh | vd |
| 0 | INF | 0.1700 | 1.52397 | 1.54042 | 54.41 |
| 1 | INF | 0.1804 | 1.51495 | 1.53747 | 41.00 |
| 2 | INF | 0.5525 | 1.51633 | 1.52977 | 64.14 |
| 3 | −1.3539 | 5.1423 | 1.83481 | 1.86892 | 42.74 |
| 4 | −3.9835 | 0.1500 | | | |
| 5 | −31.7782 | 1.7004 | 1.56907 | 1.58258 | 71.30 |
| 6 | −13.4193 | 0.1500 | | | |
| 7 | 21.4823 | 3.5431 | 1.56907 | 1.58258 | 71.30 |
| 8 | −25.8520 | 0.1500 | | | |
| 9 | 47.7023 | 4.6001 | 1.43875 | 1.44647 | 94.66 |
| 10 | −11.1433 | 0.5000 | 1.63775 | 1.66385 | 42.41 |
| 11 | 15.7885 | 5.7586 | 1.43875 | 1.44647 | 94.66 |
| 12 | −11.9231 | 0.1500 | | | |
| 13 | 43.1492 | 0.5000 | 1.63775 | 1.66385 | 42.41 |
| 14 | 9.7119 | 7.0790 | 1.43875 | 1.44647 | 94.66 |
| 15 | −7.6348 | 0.5000 | 1.61336 | 1.63723 | 44.49 |
| 16 | −75.6786 | 0.1500 | | | |
| 17 | 11.4470 | 2.6476 | 1.56907 | 1.58258 | 71.30 |
| 18 | −477.4290 | 0.1500 | | | |
| 19 | 6.3270 | 3.3233 | 1.56907 | 1.58258 | 71.30 |
| 20 | 27.2052 | 3.0573 | 1.83481 | 1.86892 | 42.74 |
| 21 | 3.2192 | 2.7299 | | | |
| 22 | −4.2921 | 0.6719 | 1.77250 | 1.79917 | 49.60 |
| 23 | 19.7083 | 2.0575 | | | |
| 24 | −88.9884 | 4.0191 | 1.73800 | 1.77943 | 32.33 |
| 25 | −7.7389 | | | | | s indicates a surface number; r, a radius of curvature (mm); d, a surface interval (mm); nd, a refractive index for a d line; nh, a refractive index for an h line; vd, an Abbe number. These marks are also applicable to the embodiments described hereinafter. Surface numbers s0 and s1 respectively indicate an object surface (surface of cover glass CG on an object side) and a surface of the cover glass CG on an image side. Surface numbers s2 and s25 respectively indicate a lens surface that is the closest to an object among the lens surfaces of the objective 1 and a lens surface that is the closest to an image among the lens surfaces of the objective 1. A space between the surface identified as surface number s1 and the surface identified as surface number s2 is filled with an immersion liquid.

As indicated in the following, the objective 1 satisfies conditional expressions (1)-(10).

$$NA_{ob}=1.4066 \tag{1}$$

$$Y_{reso} \times NA_{ob}^{8}=1.826 \text{ mm} \tag{2}$$

$$\Delta z_1/DOF_d=-0.5187 \tag{3}$$

$$n13=1.569 \tag{4}$$

$$|R1|/|R2|=0.831 \tag{5}$$

$$f1/fob=2.9629 \tag{6}$$

$$n12=1.835 \tag{7}$$

$$d12/L_{total}=0.104 \tag{8}$$

$$h1/h2=2.13 \tag{9}$$

$$L_{total}=49.62 \text{ mm} \tag{10}$$

Figure 3:
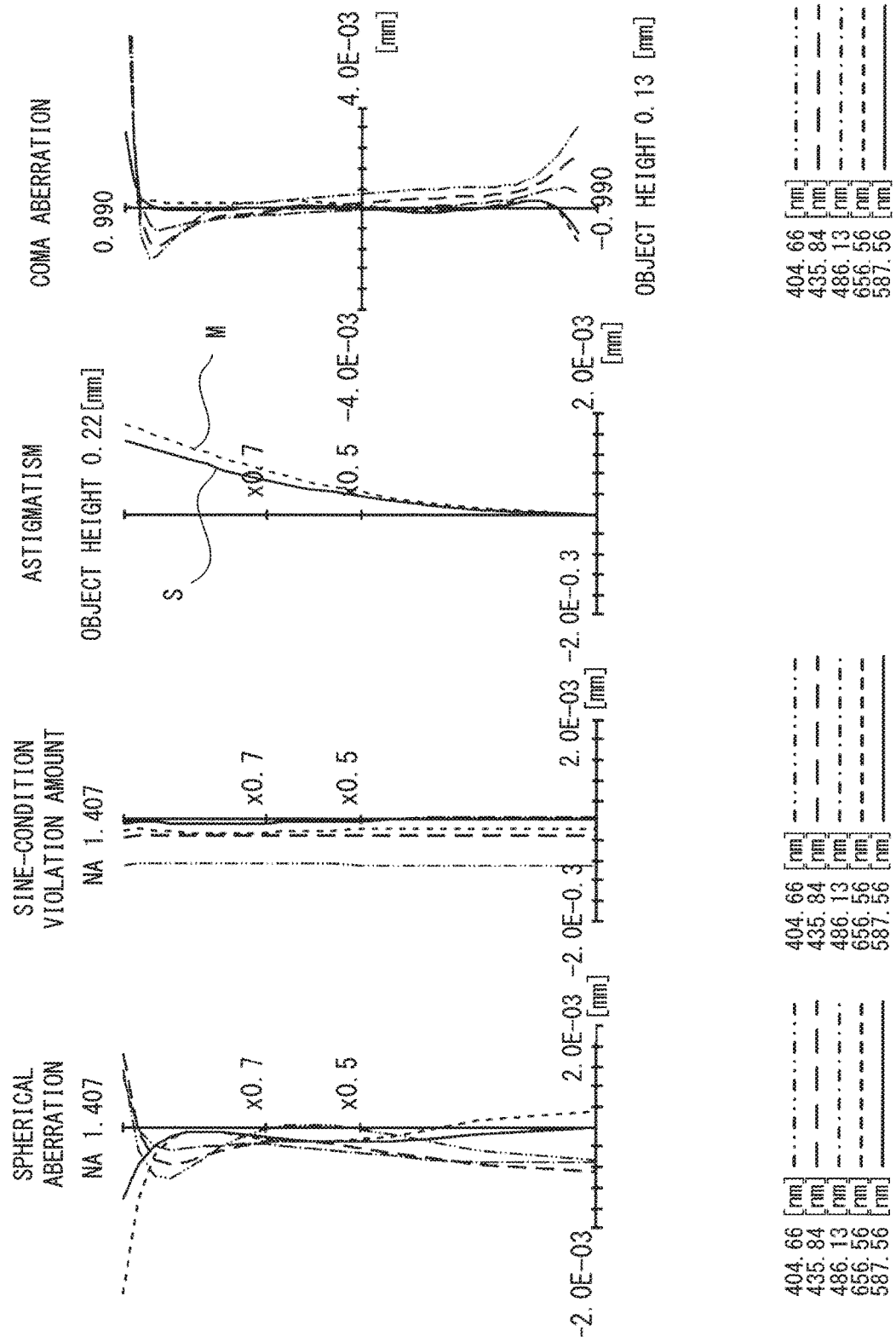
FIGS. 3A-3D are each an aberration diagram for the objective 1 depicted in FIG. 2.

FIGS. 3A-3D are each an aberration diagram for the objective 1 depicted in FIG. 2 and indicate aberrations that occur on an object surface when a pencil of infinitely distant light is incident from an image side. FIG. 3A is a spherical aberration diagram. FIG. 3B illustrates a sine-condition violation amount. FIG. 3C is an astigmatism diagram. FIG. 3D is a coma aberration diagram for a position with an object height ratio of 0.6 (object height 0.13 mm). "M" in the figures indicates a meridional component, and "S" indicates a sagittal component.

Second Embodiment

Figure 4:
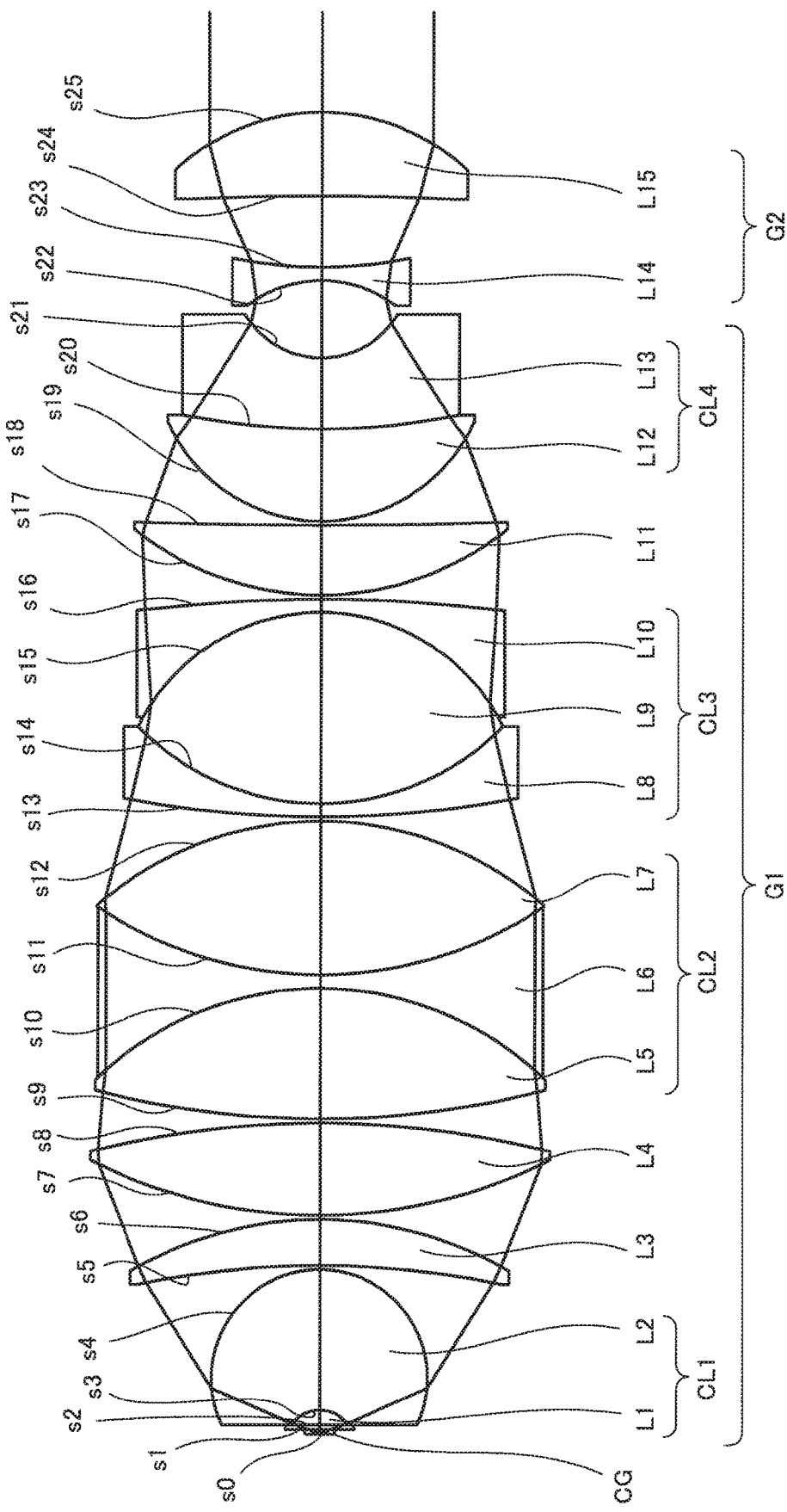
FIG. 4 is a cross-sectional view of an objective 2 in accordance with a second embodiment of the invention.

FIG. 4 is a cross-sectional view of an objective 2 in accordance with the present embodiment. The objective 2 includes: a first lens group G1 that includes a meniscus lens component that is the closest to an image among the components of the first lens group G1, the meniscus lens component having a convex surface facing an object; and a second lens group G2 that is closer to the image than the first lens group G1 is. Note that the objective 2 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a lens L11 that is a meniscus lens having a concave surface facing the image, and a cemented lens CL4, wherein the object, the cemented lens CL1, the lens L3, the lens L4, the cemented lens CL2, the cemented lens CL3, the lens L11, and the cemented lens CL4 are arranged in this order.

The cemented lens CL1 consists of a lens L1 that is a planoconvex lens having a plane surface facing the object and a lens L2 that is a meniscus lens with a negative refractive power that has a concave surface facing the object, wherein the object, the lens L1, and the lens L2 are arranged in this order. The cemented lens CL2 is a cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L12 that is a meniscus lens having a concave surface facing the image and a lens L13 that is a meniscus lens having a concave surface facing the image, wherein the object, the lens L12, and the lens L13 are arranged in this order. The cemented lens CL4 is a meniscus lens component having a convex surface facing the object.

The second lens group G2 includes a lens L14 that is a biconcave lens and a lens L15 that is a meniscus lens having a concave surface facing the object, wherein the object, the lens L14, and the lens L15 are arranged in this order.

The following are various data on the objective 2, where $\Phi_1$ indicates the outer diameter of the lens L13, i.e., the lens that is the closest to the image among the lenses of the cemented lens CL4, wherein the cemented lens CL4 is the meniscus lens component that is the closest to the image among the components of the first lens group G1.

$NA_{ob}$=1.417, $Y_{reso}$=0.113 mm, $|\beta|$=59.992, $\Delta z_1$=−0.091 μm, $DOF_d$=0.206 μm, n13=1.569, R1=18.999 mm, R2=−35.361 mm, f1=9.491 mm, fob=3.000 mm, n12=1.835, $L_{total}$=49.620 mm, d12=5.272 mm, h1=5.434 mm, h2=2.654 mm, $\Phi_1$=11.1 mm The following are lens data of the objective 2.

| Objective 2 | | | | | |
| --- | --- | --- | --- | --- | --- |
| s | r | d | nd | nh | νd |
| 0 | INF | 0.1700 | 1.52397 | 1.54042 | 54.41 |
| 1 | INF | 0.1804 | 1.51495 | 1.53747 | 41.00 |
| 2 | INF | 0.5525 | 1.51633 | 1.52977 | 64.14 |
| 3 | −1.3089 | 5.2716 | 1.83481 | 1.86892 | 42.74 |
| 4 | −4.0679 | 0.1500 | | | |
| 5 | −33.5222 | 1.7196 | 1.56907 | 1.58258 | 71.30 |
| 6 | −13.9943 | 0.1500 | | | |
| 7 | 18.9987 | 3.4627 | 1.56907 | 1.58258 | 71.30 |
| 8 | −35.3610 | 0.1500 | | | |
| 9 | 33.4656 | 4.8814 | 1.43875 | 1.44647 | 94.66 |
| 10 | −12.0808 | 0.5000 | 1.63775 | 1.66385 | 42.41 |
| 11 | 14.9689 | 5.7755 | 1.43875 | 1.44647 | 94.66 |
| 12 | −12.6497 | 0.1500 | | | |
| 13 | 38.7158 | 0.5000 | 1.63775 | 1.66385 | 42.41 |
| 14 | 9.5240 | 7.1835 | 1.43875 | 1.44647 | 94.66 |
| 15 | −7.5841 | 0.5000 | 1.63775 | 1.66385 | 42.41 |
| 16 | −55.9822 | 0.1500 | | | |
| 17 | 11.1111 | 2.6156 | 1.56907 | 1.58258 | 71.30 |
| 18 | 191.1484 | 0.1500 | | | |
| 19 | 6.2864 | 3.4593 | 1.56907 | 1.58258 | 71.30 |
| 20 | 25.2360 | 2.6874 | 1.83481 | 1.86892 | 42.74 |
| 21 | 3.3456 | 2.9026 | | | |
| 22 | −4.6559 | 0.5000 | 1.77250 | 1.79917 | 49.60 |
| 23 | 16.2912 | 2.6773 | | | |
| 24 | −102.5151 | 3.1811 | 1.73800 | 1.77943 | 32.33 |
| 25 | −7.9332 | | | | |

As indicated in the following, the objective 2 satisfies conditional expressions (1)-(10).

$$NA_{ob}=1.4166 \tag{1}$$

$$Y_{reso} \times NA_{ob}^8=1.832 \text{ mm} \tag{2}$$

$$\Delta z_1/DOF_d=-0.4422 \tag{3}$$

$$n13=1.569 \tag{4}$$

$$|R1|/|R2|=0.537 \tag{5}$$

$$f1/fob=3.1632 \tag{6}$$

$$n12=1.835 \tag{7}$$

$$d12/L_{total}=0.106 \tag{8}$$

$$h1/h2=2.05 \tag{8}$$

$$L_{total}=49.62 \text{ mm} \tag{10}$$

Figure 5:
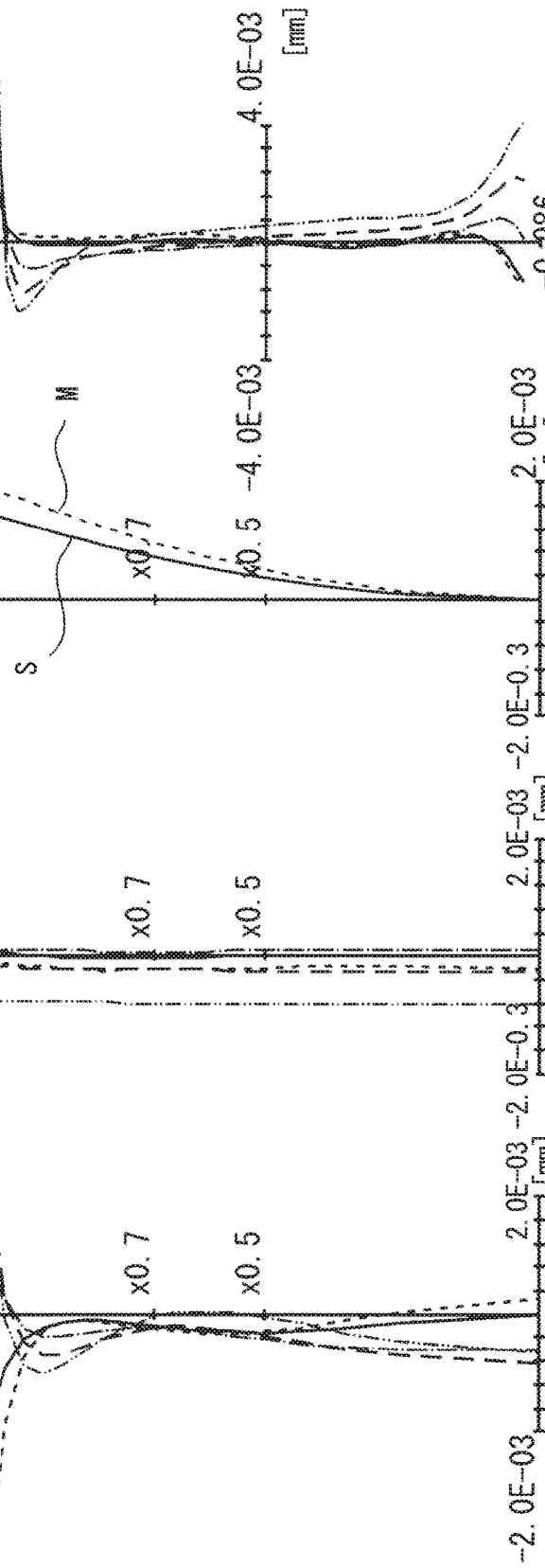
FIGS. 5A-5D are each an aberration diagram for the objective 2 depicted in FIG. 4.

FIGS. 5A-5D are each an aberration diagram for the objective 2 depicted in FIG. 4 and indicate aberrations that occur on an object surface when a pencil of infinitely distant light is incident from an image side. FIG. 5A is a spherical aberration diagram. FIG. 5B illustrates a sine-condition violation amount. FIG. 5C is an astigmatism diagram. FIG. 5D is a coma aberration diagram for a position with an object height ratio of 0.6 (object height 0.13 mm).

Third Embodiment

Figure 6:
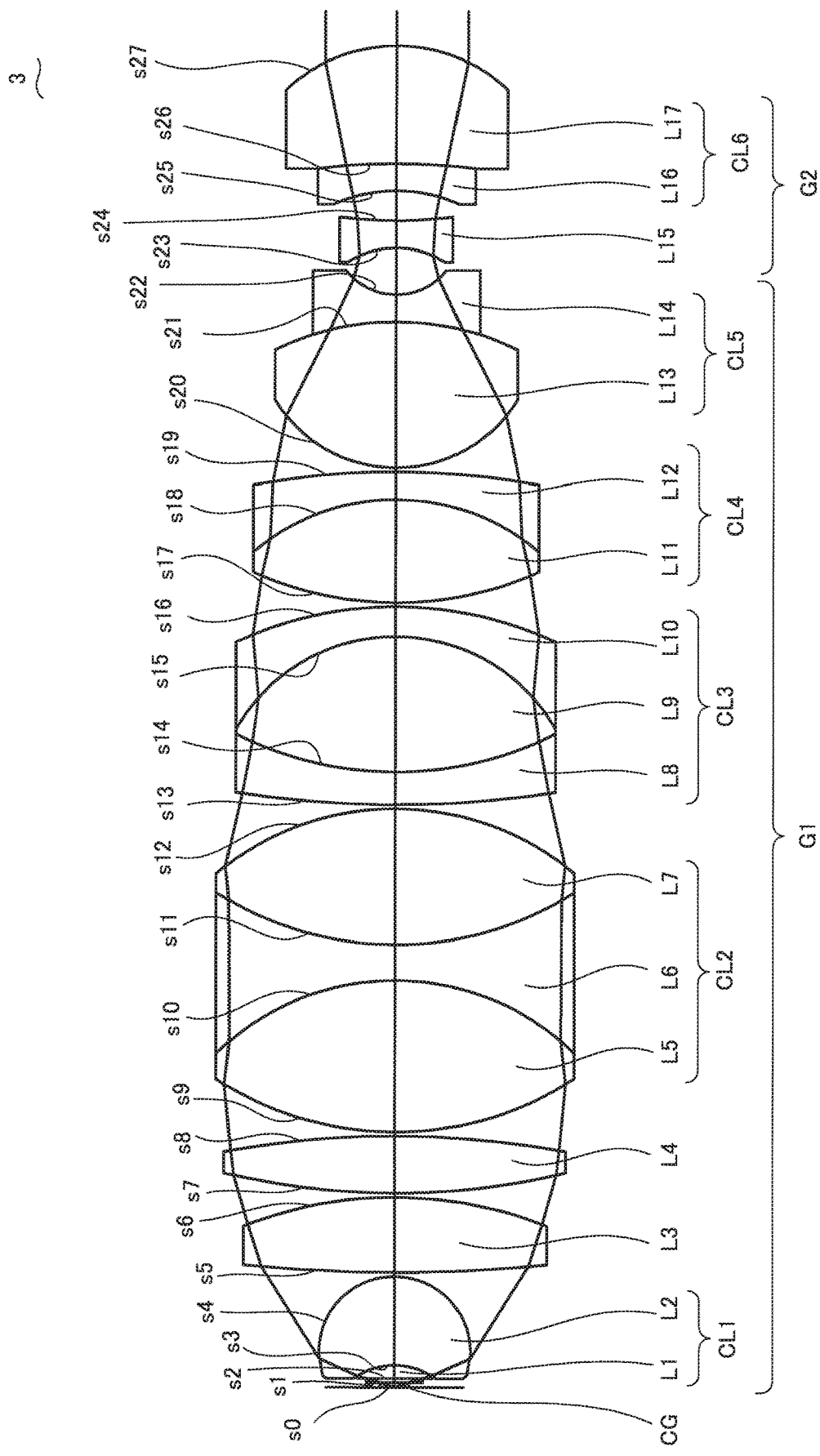
FIG. 6 is a cross-sectional view of an objective 3 in accordance with a third embodiment of the invention.

FIG. 6 is a cross-sectional view of an objective 3 in accordance with the present embodiment. The objective 3 includes: a first lens group G1 that includes a meniscus lens component that is the closest to an image among the components of the first lens group G1, the meniscus lens component having a convex surface facing an object; and a second lens group G2 that is closer to the image than the first lens group G1 is. Note that the objective 3 is an immersion microscope objective.

The first lens group G1 includes a cemented lens CL1, a lens L3 that is a biconvex lens, a lens L4 that is a biconvex lens, a cemented lens CL2, a cemented lens CL3, a cemented lens CL4, and a cemented lens CL5, wherein the object, the cemented lens CL1, the lens L3, the lens L4, the cemented lens CL2, the cemented lens CL3, the cemented lens CL4, and the cemented lens CL5 are arranged in this order.

The cemented lens CL1 consists of a lens L1 that is a planoconvex lens having a plane surface facing the object and a lens L2 that is a meniscus lens with a negative refractive power that has a concave surface facing the object, wherein the object, the lens L1, and the lens L2 are arranged in this order. The cemented lens CL2 is a cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L11 that is a biconvex lens and a lens L12 that is a meniscus lens having a concave surface facing the object, wherein the object, the lens L11, and the lens L12 are arranged in this order. The cemented lens CL5 consists of a lens L13 that is a biconvex lens and a lens L14 that is a biconcave lens, wherein the object, the lens L13, and the lens L14 are arranged in this order. The cemented lens CL5 is a meniscus lens component having a convex surface facing the object.

The second lens group G2 includes a lens L15 that is a biconcave lens and a cemented lens CL6, wherein the object, the lens L15, and the cemented lens CL6 are arranged in this order. The cemented lens CL6 consists of a lens L16 that is a meniscus lens having a concave surface facing the object and a lens L17 that is a meniscus lens having a concave surface facing the object, wherein the object, the lens L16, and the lens L17 are arranged in this order.

The following are various data on the objective 3, where $\Phi_1$ indicates the outer diameter of the lens L14, i.e., the lens that is the closest to the image among the lenses of the cemented lens CL5, wherein the cemented lens CL5 is the meniscus lens component that is the closest to the image among the components of the first lens group G1.

$NA_{ob}$=1.450, $Y_{reso}$=0.093 mm, $|\beta|$=99.913, $\Delta z_1$=0.129 µm, $DOF_d$=0.197 µm, n13=1.439, R1=26.716 mm, R2=−34.654 mm, f1=4.213 mm, fob=1.802 mm, n12=1.804, $L_{total}$=49.045 mm, d12=3.245 mm, h1=4.020 mm, h2=1.546 mm, $\Phi_1$=7.2 mm The following are lens data of the objective 3.

| Objective 3 | | | | | |
|---|---|---|---|---|---|
| s | r | d | nd | nh | νd |
| 0 | INF | 0.1700 | 1.52397 | 1.54042 | 54.41 |
| 1 | INF | 0.1502 | 1.51495 | 1.53747 | 41.00 |
| 2 | INF | 0.4895 | 1.51633 | 1.52977 | 64.14 |
| 3 | −2.5256 | 3.2449 | 1.80400 | 1.83385 | 46.53 |
| 4 | −2.7580 | 0.1500 | | | |
| 5 | 57.0411 | 2.7388 | 1.56907 | 1.58258 | 71.30 |
| 6 | −15.1633 | 0.1500 | | | |
| 7 | 26.7162 | 2.0636 | 1.43875 | 1.44647 | 94.66 |
| 8 | −34.6539 | 0.1500 | | | |
| 9 | 12.0693 | 5.5296 | 1.43875 | 1.44647 | 94.66 |
| 10 | −9.3615 | 1.3000 | 1.63775 | 1.66385 | 42.41 |
| 11 | 12.2890 | 4.9604 | 1.43875 | 1.44647 | 94.66 |
| 12 | −10.2507 | 0.1500 | | | |
| 13 | 38.3223 | 1.2000 | 1.75500 | 1.77954 | 52.32 |
| 14 | 12.9929 | 4.9349 | 1.43875 | 1.44647 | 94.66 |
| 15 | −6.7513 | 1.1000 | 1.75500 | 1.77954 | 52.32 |
| 16 | −13.8019 | 0.1500 | | | |
| 17 | 12.8304 | 3.7776 | 1.43875 | 1.44647 | 94.66 |
| 18 | −8.0374 | 1.0000 | 1.75500 | 1.77954 | 52.32 |
| 19 | −28.8995 | 0.1500 | | | |
| 20 | 5.1902 | 5.3476 | 1.56907 | 1.58258 | 71.30 |
| 21 | −10.1104 | 1.0000 | 1.63775 | 1.66385 | 42.41 |
| 22 | 2.3315 | 1.7000 | | | |
| 23 | −3.3075 | 1.0000 | 1.75500 | 1.77954 | 52.32 |
| 24 | 16.1481 | 1.1000 | | | |
| 25 | −5.4713 | 1.0000 | 1.51633 | 1.52977 | 64.14 |
| 26 | −22.0790 | 4.3375 | 1.73800 | 1.77943 | 32.33 |
| 27 | −5.8878 | | | | |

As indicated in the following, the objective 3 satisfies conditional expressions (1)-(10), excluding conditional expressions (6) and (8).

$$NA_{ob}=1.4498 \tag{1}$$

$$Y_{reso} \times NA_{ob}^8 = 1.823 \text{ mm} \tag{2}$$

$$\Delta z_1 / DOF_d = 0.6566 \tag{3}$$

$$n13 = 1.439 \tag{4}$$

$$|R1|/|R2| = 0.771 \tag{5}$$

$$f1/fob = 2.3387 \tag{6}$$

$$n12 = 1.804 \tag{7}$$

$$d12/L_{total} = 0.066 \tag{8}$$

$$h1/h2 = 2.60 \tag{9}$$

$$L_{total} = 49.04 \text{ mm} \tag{10}$$

Figure 7:
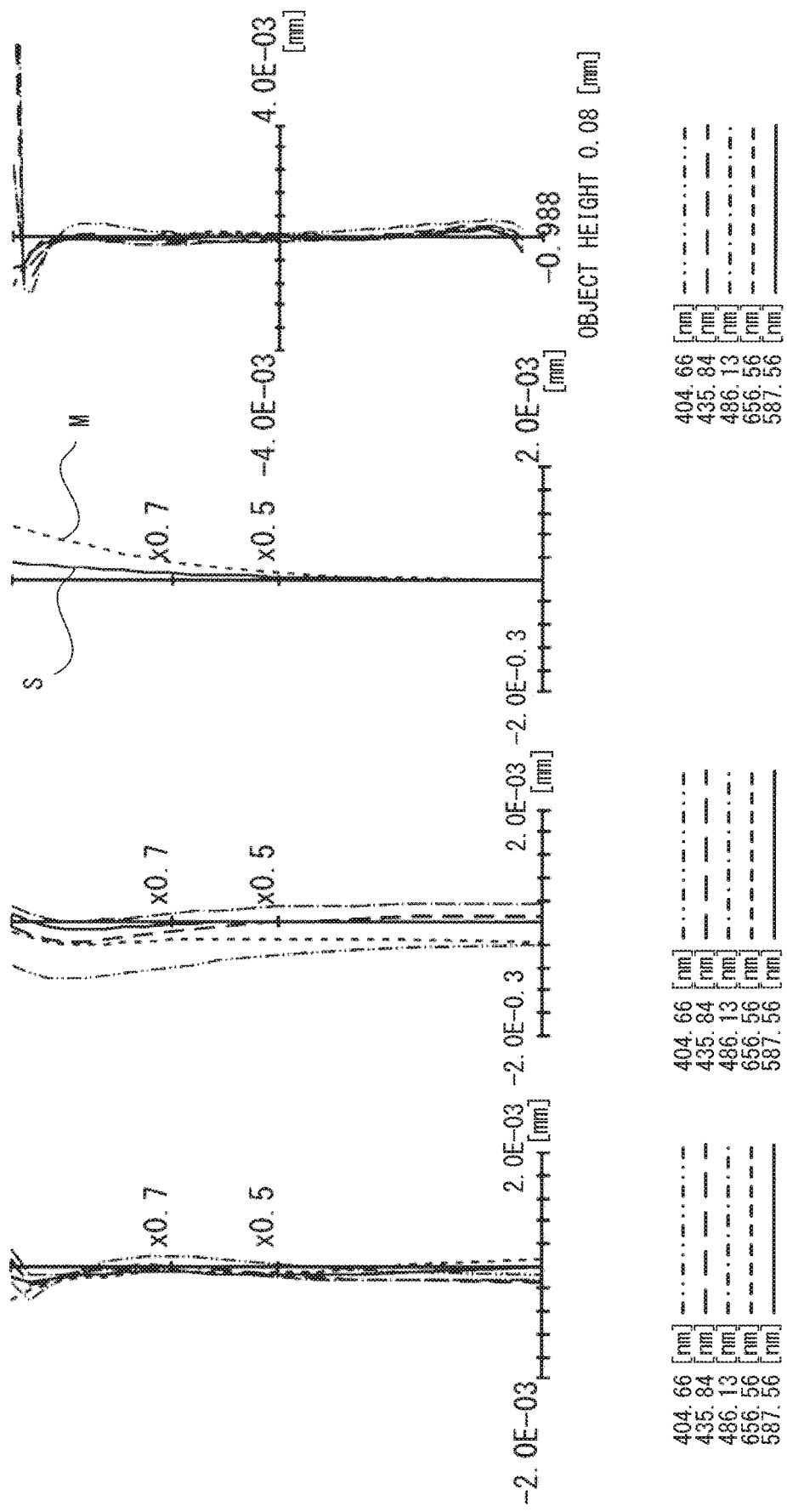
FIGS. 7A-7D are each an aberration diagram for the objective 3 depicted in FIG. 6.

FIGS. 7A-7D are each an aberration diagram for the objective 3 depicted in FIG. 6 and indicate aberrations that occur on an object surface when a pencil of infinitely distant light is incident from an image side. FIG. 7A is a spherical aberration diagram. FIG. 7B illustrates a sine-condition violation amount. FIG. 7C is an astigmatism diagram. FIG. 7D is a coma aberration diagram for a position with an object height ratio of 0.6 (object height 0.08 mm).

Fourth Embodiment

Figure 8:
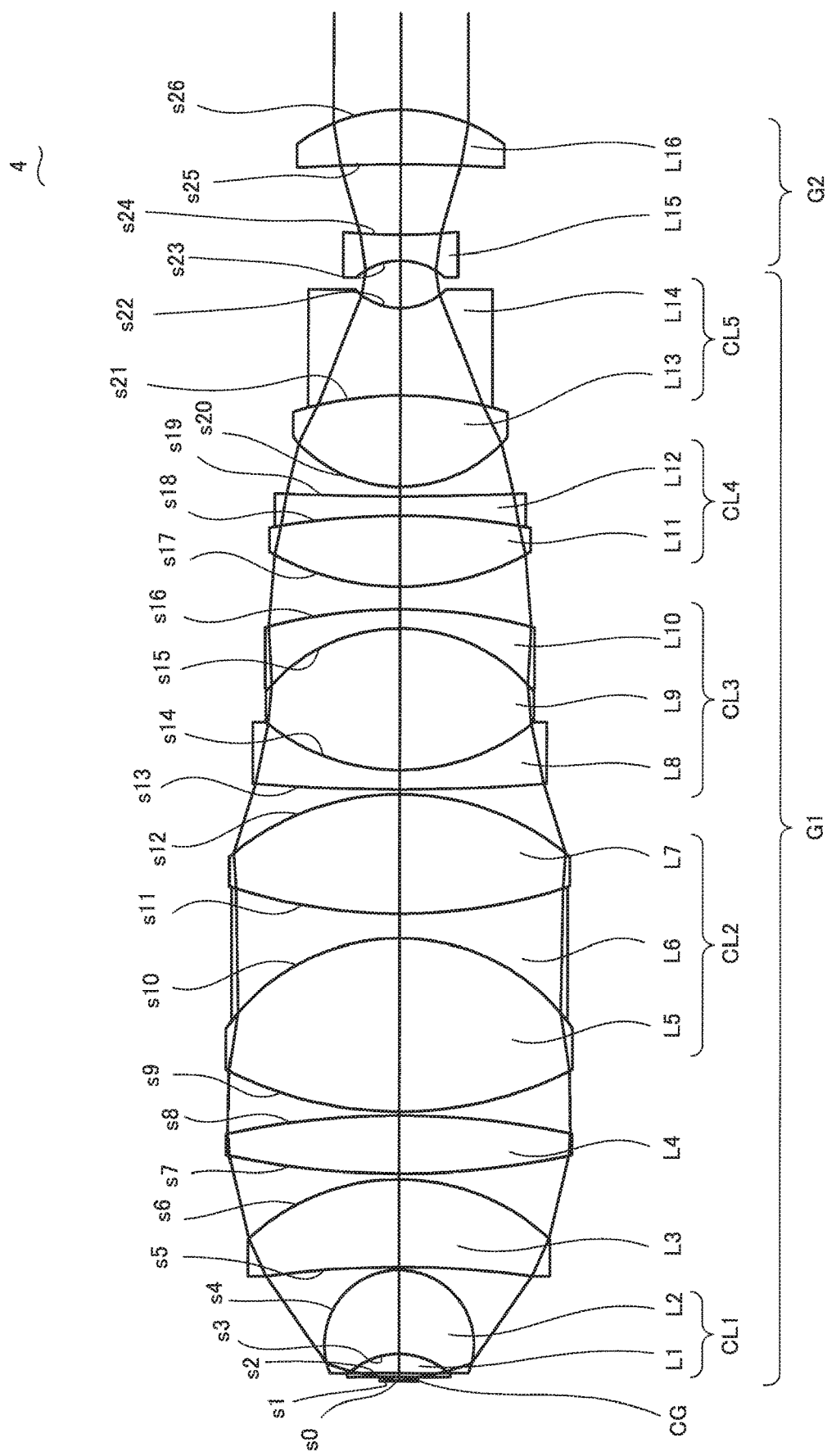
FIG. 8 is a cross-sectional view of an objective 4 in accordance with a fourth embodiment of the invention.

FIG. 8 is a cross-sectional view of an objective 4 in accordance with the present embodiment. The objective 4 includes: a first lens group G1 that includes a meniscus lens component that is the closest to an image among the components of the first lens group G1, the meniscus lens component having a convex surface facing an object; and a second lens group G2 that is closer to the image than the first lens group G1 is. Note that the objective 4 is an immersion microscope objective.

The first lens group G1 includes a cemented lens CL1, a lens L3 that is a meniscus lens having a concave surface facing the object, a lens L4 that is a biconvex lens, a cemented lens CL2, a cemented lens CL3, a cemented lens CL4, and a cemented lens CL5, wherein the object, the cemented lens CL1, the lens L3, the lens L4, the cemented lens CL2, the cemented lens CL3, the cemented lens CL4, and the cemented lens CL5 are arranged in this order.

The cemented lens CL1 consists of a lens L1 that is a planoconvex lens having a plane surface facing the object and a lens L2 that is a meniscus lens with a negative refractive power that has a concave surface facing the object, wherein the object, the lens L1, and the lens L2 are arranged in this order. The cemented lens CL2 is a cemented triplet lens and consists of a lens L5 that is a biconvex lens, a lens L6 that is a biconcave lens, and a lens L7 that is a biconvex lens, wherein the object, the lens L5, the lens L6, and the lens L7 are arranged in this order. The cemented lens CL3 is a cemented triplet lens and consists of a lens L8 that is a meniscus lens having a concave surface facing the image, a lens L9 that is a biconvex lens, and a lens L10 that is a meniscus lens having a concave surface facing the object, wherein the object, the lens L8, the lens L9, and the lens L10 are arranged in this order. The cemented lens CL4 is a cemented doublet lens and consists of a lens L11 that is a biconvex lens and a lens L12 that is a biconcave lens, wherein the object, the lens L11, and the lens L12 are arranged in this order. The cemented lens CL5 consists of a lens L13 that is a biconvex lens and a lens L14 that is a biconcave lens, wherein the object, the lens L13, and the lens L14 are arranged in this order. The cemented lens CL5 is a meniscus lens component having a convex surface facing the object.

The second lens group G2 includes a lens L15 that is a biconcave lens, and a lens L16 that is a meniscus lens having a concave surface facing the object, wherein the object, the lens L15, and the lens L16 are arranged in this order.

The following are various data on the objective 4, where $\Phi_1$ indicates the outer diameter of the lens L14, i.e., the lens that is the closest to the image among the lenses of the cemented lens CL5, wherein the cemented lens CL5 is the meniscus lens component that is the closest to the image among the components of the first lens group G1.

$NA_{ob}$=1.486, $Y_{reso}$=0.057 mm, 1131=99.847, $\Delta z_1$=0.136 µm, $DOF_d$=0.187 µm, n13=1.569, R1=32.120 mm, R2=−32.120 mm, f1=4.588 mm, fob=1.803 mm, n12=1.755, $L_{total}$=49.417 mm, d12=3.260 mm, h1=3.957 mm, h2=1.530 mm, $\Phi_1$=7.4 mm The following are lens data of the objective 4.

| Objective 4 | | | | | |
|---|---|---|---|---|---|
| s | r | d | nd | nh | vd |
| 0 | INF | 0.1700 | 1.52397 | 1.54042 | 54.41 |
| 1 | INF | 0.1500 | 1.51495 | 1.53747 | 41.00 |
| 2 | INF | 0.7500 | 1.51823 | 1.53315 | 58.90 |
| 3 | −2.8807 | 3.2600 | 1.75500 | 1.77954 | 52.32 |
| 4 | −2.8995 | 0.1200 | | | |
| 5 | −37.8958 | 3.3980 | 1.56907 | 1.58258 | 71.30 |
| 6 | −8.5504 | 0.2097 | | | |
| 7 | 32.1203 | 2.2496 | 1.56907 | 1.58258 | 71.30 |
| 8 | −32.1203 | 0.1500 | | | |
| 9 | 14.7319 | 6.7160 | 1.43875 | 1.44647 | 94.66 |
| 10 | −8.2417 | 0.9500 | 1.63775 | 1.66385 | 42.41 |
| 11 | 21.2280 | 4.6469 | 1.43875 | 1.44647 | 94.66 |
| 12 | −10.2146 | 0.1894 | | | |
| 13 | 73.5000 | 0.7500 | 1.75500 | 1.77954 | 52.32 |
| 14 | 8.2427 | 5.4936 | 1.43875 | 1.44647 | 94.66 |
| 15 | −6.7129 | 0.7500 | 1.63775 | 1.66385 | 42.41 |
| 16 | −19.3432 | 0.8771 | | | |
| 17 | 10.2057 | 2.7708 | 1.43875 | 1.44647 | 94.66 |
| 18 | −26.7569 | 0.7500 | 1.63775 | 1.66385 | 42.41 |
| 19 | 97.7100 | 0.3597 | | | |
| 20 | 5.4558 | 3.5551 | 1.56907 | 1.58258 | 71.30 |
| 21 | −13.8634 | 3.4091 | 1.75500 | 1.77954 | 52.32 |
| 22 | 2.5361 | 1.8500 | | | |
| 23 | −2.5957 | 0.9971 | 1.63775 | 1.66385 | 42.41 |
| 24 | 25.6406 | 2.7471 | | | |
| 25 | −62.1642 | 2.1476 | 1.73800 | 1.77943 | 32.33 |
| 26 | −6.6546 | | | | |

As indicated in the following, the objective 4 satisfies conditional expressions (1)-(10), excluding conditional expressions (7) and (8).

$$NA_{ob}=1.4864 \tag{1}$$

$$Y_{reso} \times NA_{ob}^8 = 1.374 \text{ mm} \tag{2}$$

$$\Delta z_1/DOF_d = 0.7284 \tag{3}$$

$$n13=1.569 \tag{4}$$

$$|R1|/|R2|=1.000 \tag{5}$$

$$f1/fob=2.5451 \tag{6}$$

$$n12=1.755 \tag{7}$$

$$d12/L_{total}=0.066 \tag{8}$$

$$h1/h2=2.59 \tag{9}$$

$$L_{total}=49.42 \text{ mm} \tag{10}$$

FIGS. 9A-9D are each an aberration diagram for the objective 4 depicted in FIG. 8 and indicate aberrations that occur on an object surface when a pencil of infinitely distant light is incident from an image side. FIG. 9A is a spherical aberration diagram. FIG. 9B illustrates a sine-condition violation amount. FIG. 9C is an astigmatism diagram. FIG. 9D is a coma aberration diagram for a position with an object height ratio of 0.6 (object height 0.07 mm).

What is claimed is:

1. An immersion microscope objective comprising:
   a first lens group that includes a meniscus lens component that is the closest to an image among lens components of the first lens group, the meniscus lens component having a convex surface facing an object; and
   a second lens group that is closer to the image than the first lens group is;
   wherein:
   the immersion microscope objective satisfies the following conditional expressions:

$$1.4 < NA_{ob} \leq 1.51 \tag{1}$$

$$1.30 \text{ mm} \leq Y_{reso} \times NA_{ob}^8 \tag{2}$$

$$L_{total} \leq 65 \text{ mm} \tag{10}$$

where $NA_{ob}$ indicates a numerical aperture of an object side of the immersion microscope objective, $Y_{reso}$ indicates a maximum object height within a region on a plane orthogonal to an optical axis that crosses a position on the optical axis at which an RMS wave aberration in a d line is minimized, the region having an RMS wave aberration in the d line that is $0.1\lambda_d$ or less provided therewithin, $\lambda_d$ indicates a wavelength of the d line, and $L_{total}$ indicates a distance on the optical axis from an object surface to a lens surface that is closest to the image among lens surfaces of the immersion microscope objective.

2. The immersion microscope objective of claim 1, having a 40-fold magnification or higher.

3. The immersion microscope objective of claim 1, satisfying the following conditional expression:

$$-2 \leq \Delta z_1/DOF_d \leq 2 \tag{3}$$

where $\Delta z_1$ indicates a difference between a position on the optical axis at which an RMS wave aberration in an h line is minimized and the position on the optical axis at which an RMS wave aberration in the d line is minimized, and $DOF_d$ indicates a depth of focus for the d line.

4. The immersion microscope objective of claim 2, satisfying the following conditional expression:

$$-2 \leq \Delta z_1/DOF_d \leq 2 \tag{3}$$

where $\Delta z_1$ indicates a difference between a position on the optical axis at which an RMS wave aberration in an h line is minimized and the position on the optical axis at which an RMS wave aberration in the d line is minimized, and $DOF_d$ indicates a depth of focus for the d line.

5. The immersion microscope objective of claim 1, wherein:
   the first lens group includes a first cemented lens that is closest to the object among lenses of the first lens group,
   the first cemented lens consists of:
      a planoconvex lens having a plane surface facing the object, and
      a meniscus lens with a negative refractive power that has a concave surface facing the object, and
   the object, the planoconvex lens, and the meniscus lens are arranged in this order.

6. The immersion microscope objective of claim 2, wherein:
the first lens group includes a first cemented lens that is closest to the object among lenses of the first lens group,
the first cemented lens consists of:
a planoconvex lens having a plane surface facing the object, and
a meniscus lens with a negative refractive power that has a concave surface facing the object, and
the object, the planoconvex lens, and the meniscus lens are arranged in this order.

7. The immersion microscope objective of claim 3, wherein:
the first lens group includes a first cemented lens that is closest to the object among lenses of the first lens group,
the first cemented lens consists of:
a planoconvex lens having a plane surface facing the object, and
a meniscus lens with a negative refractive power that has a concave surface facing the object, and
the object, the planoconvex lens, and the meniscus lens are arranged in this order.

8. The immersion microscope objective of claim 4, wherein:
the first lens group includes a first cemented lens that is closest to the object among lenses of the first lens group,
the first cemented lens consists of:
a planoconvex lens having a plane surface facing the object, and
a meniscus lens with a negative refractive power that has a concave surface facing the object, and
the object, the planoconvex lens, and the meniscus lens are arranged in this order.

9. The immersion microscope objective of claim 5, wherein:
the first lens group further includes a biconvex lens,
the biconvex lens is included in a lens component that is closest, second closest, or third closest to the object among lens components of the immersion microscope objective, and
the immersion microscope objective satisfies the following conditional expression:

$$1.4 \leq n13 \leq 1.85 \tag{4}$$

where n13 indicates a refractive index that the biconvex lens has for the d line.

10. The immersion microscope objective of claim 6, wherein:
the first lens group further includes a biconvex lens,
the biconvex lens is included in a lens component that is closest, second closest, or third closest to the object among lens components of the immersion microscope objective, and
the immersion microscope objective satisfies the following conditional expression:

$$1.4 \leq n13 \leq 1.85 \tag{4}$$

where n13 indicates a refractive index that the biconvex lens has for the d line.

11. The immersion microscope objective of claim 7, wherein:
the first lens group further includes a biconvex lens,
the biconvex lens is included in a lens component that is closest, second closest, or third closest to the object among lens components of the immersion microscope objective, and
the immersion microscope objective satisfies the following conditional expression:

$$1.4 \leq n13 \leq 1.85 \tag{4}$$

where n13 indicates a refractive index that the biconvex lens has for the d line.

12. The immersion microscope objective of claim 8, wherein:
the first lens group further includes a biconvex lens,
the biconvex lens is included in a lens component that is closest, second closest, or third closest to the object among lens components of the immersion microscope objective, and
the immersion microscope objective satisfies the following conditional expression:

$$1.4 \leq n13 \leq 1.85 \tag{4}$$

where n13 indicates a refractive index that the biconvex lens has for the d line.

13. The immersion microscope objective of claim 9, satisfying the following conditional expression:

$$0 \leq |R1|/|R2| \leq 1 \tag{5}$$

where R1 indicates a radius of curvature of a lens surface on an object side of the biconvex lens, and R2 indicates a radius of curvature of a lens surface on an image side of the biconvex lens.

14. The immersion microscope objective of claim 10, satisfying the following conditional expression:

$$0 \leq |R1|/|R2| \leq 1 \tag{5}$$

where R1 indicates a radius of curvature of a lens surface on an object side of the biconvex lens, and R2 indicates a radius of curvature of a lens surface on an image side of the biconvex lens.

15. The immersion microscope objective of claim 11, satisfying the following conditional expression:

$$0 \leq |R1|/|R2| \leq 1 \tag{5}$$

where R1 indicates a radius of curvature of a lens surface on an object side of the biconvex lens, and R2 indicates a radius of curvature of a lens surface on an image side of the biconvex lens.

16. The immersion microscope objective of claim 9, wherein
the second lens group includes:
a lens component that is closest to the object among lens components of the second lens group, the lens component having a concave surface facing the object, and
at least one lens component that is different from the lens component having the concave surface facing the object.

17. The immersion microscope objective of claim 9, satisfying the following conditional expressions:

$$2.4 \leq f1/fob \tag{6}$$

$$1.8 \leq n12 \leq 1.85 \tag{7}$$

where f1 indicates a focal length that the first cemented lens has for the d line, fob indicates a focal length that the immersion microscope objective has for the d line, and n12 indicates a refractive index that the meniscus lens of the first cemented lens has for the d line.

18. The immersion microscope objective of claim 9, satisfying the following conditional expression:

$$0.095 \leq d12/L_{total} \tag{8}$$

where d12 indicates a thickness that the meniscus lens of the first cemented lens has on the optical axis.

19. The immersion microscope objective of claim 9, satisfying the following conditional expression:

$$2 \leq h1/h2 \leq 3 \tag{9}$$

where h1 indicates a height of an axial marginal ray at a lens surface on an object side of the meniscus lens component, and h2 indicates a height of the axial marginal ray at a lens surface on an image side of the meniscus lens component.

* * * * *